(12) United States Patent
Chu

(10) Patent No.: US 9,108,474 B2
(45) Date of Patent: Aug. 18, 2015

(54) RELIEF-VALVE DEVICE FOR AN AIR PRESSURE GAUGE

(71) Applicant: JIAO HSIUNG INDUSTRY CORP., New Taipei (TW)

(72) Inventor: Keng-Fong Chu, New Taipei (TW)

(73) Assignee: HAO HSIUNG INDUSTRY CORP. (TW)

( * ) Notice: Subject to any disclaimer, the term of this patent is extended or adjusted under 35 U.S.C. 154(b) by 165 days.

(21) Appl. No.: 14/053,886

(22) Filed: Oct. 15, 2013

(65) Prior Publication Data
US 2015/0101678 A1 Apr. 16, 2015

(51) Int. Cl.
*G01L 17/00* (2006.01)
*B60C 29/06* (2006.01)
*F16K 15/20* (2006.01)

(52) U.S. Cl.
CPC .............. *B60C 29/068* (2013.04); *F16K 15/20* (2013.01); *G01L 17/00* (2013.01); *Y10T 137/3662* (2015.04); *Y10T 137/3677* (2015.04)

(58) Field of Classification Search
CPC ............... Y10T 137/7904; Y10T 137/7922; Y10T 137/3677; Y10T 137/3662; B60C 29/068; B60C 29/064; B60C 23/04; F16K 15/20; G01L 19/00; G01L 17/00; F04B 45/06; F04B 33/00; A63B 41/12; G01M 3/3272
USPC .......... 137/226–229, 528, 535; 251/318–321, 251/339
See application file for complete search history.

(56) References Cited

U.S. PATENT DOCUMENTS

| | | | | |
|---|---|---|---|---|
| 1,209,213 A | * | 12/1916 | Schneider | 137/223 |
| 1,403,797 A | * | 1/1922 | McCormick et al. | 137/227 |
| 2,039,638 A | * | 5/1936 | Druge et al. | 137/454.5 |
| 2,173,619 A | * | 9/1939 | Ames | 137/229 |
| 2,635,623 A | * | 4/1953 | Moffett | 137/229 |
| 3,479,868 A | * | 11/1969 | Boyer | 73/146.8 |
| 3,999,430 A | * | 12/1976 | Parduhn | 73/146.3 |
| 4,050,311 A | * | 9/1977 | Leach | 600/498 |
| 4,072,171 A | * | 2/1978 | Nakazawa | 137/599.18 |
| 4,078,728 A | * | 3/1978 | Nordeen | 239/586 |
| 5,131,275 A | * | 7/1992 | Huang | 73/756 |
| 5,148,712 A | * | 9/1992 | Cross et al. | 73/756 |

(Continued)

FOREIGN PATENT DOCUMENTS

DE 102005018781 A1 11/2006
EP 2497657 A1 9/2012

OTHER PUBLICATIONS

English language Abstract for DE102005018781 A1.

*Primary Examiner* — Craig Schneider
*Assistant Examiner* — Craig J Price
(74) *Attorney, Agent, or Firm* — Hershkovitz & Associates, PLLC; Abe Hershkovitz

(57) ABSTRACT

A relief-valve device for an air pressure gauge has a casing, a relief-valve assembly, a valve shaft, and a push button. The casing has a connecting member, a pressure detecting member and a discharging member. The relief-valve assembly is mounted in the discharging member and has a valve seat, a first seal ring, a second seal ring and a mounting cover. The valve shaft is mounted axially slidably in the relief-valve assembly and has a shaft member and a valve head. The shaft member has a discharging notch selectively aligning with the second seal ring to allow high pressure air in an inflatable product connecting to the air pressure gauge to be discharged slowly and finely out of the relief-valve device.

6 Claims, 5 Drawing Sheets

(56) References Cited

U.S. PATENT DOCUMENTS

| | | | |
|---|---|---|---|
| 5,556,258 A * | 9/1996 | Lange et al. | 417/63 |
| 5,690,312 A * | 11/1997 | Yang | 251/321 |
| 5,853,071 A * | 12/1998 | Robinson | 251/321 |
| 5,921,269 A * | 7/1999 | Wu | 137/223 |
| 7,040,355 B2 * | 5/2006 | Wu | 137/223 |
| 7,077,162 B2 * | 7/2006 | Burdick | 137/881 |
| 8,393,221 B2 * | 3/2013 | Yang et al. | 137/227 |
| 8,960,214 B2 * | 2/2015 | Kozuschek et al. | 137/223 |
| 2005/0263185 A1 * | 12/2005 | Chen | 137/231 |
| 2007/0113666 A1 * | 5/2007 | Rutherford et al. | 73/732 |

* cited by examiner

RELIEF-VALVE DEVICE FOR AN AIR PRESSURE GAUGE

BACKGROUND OF THE INVENTION

1. Field of the Invention

The present invention relates to a valve device, and more particularly to a relief-valve device for an air pressure gauge; the relief-valve device can be further fabricated into an air pressure gauge for measuring internal pressure of an inflatable product, and is able to finely deflate the inflatable product for reducing excessive internal pressure thereof.

2. Description of Related Art

Conventional air pressure gauges are used for detecting and ensuring internal pressure in inflatable products such as basketballs and tires at a predetermined value. A conventional air pressure gauge has a relief valve for deflating the inflatable product for reducing the over high internal pressure thereof. However, the relief valve on the air pressure gauge always operates at a deflating speed too fast to finely and precisely adjust the internal pressure so that the inflatable product is usually over-deflated by the relief valve and a user needs to re-inflate the inflatable product for acquiring a precise internal pressure.

To overcome the shortcomings, the present invention provides a relief-valve device for an air pressure gauge to mitigate or obviate the aforementioned problems.

SUMMARY OF THE INVENTION

The main objective of the invention is to provide a relief-valve device for an air pressure gauge; the relief-valve device can be further fabricated to an air pressure gauge for measuring internal pressure of an inflatable product and is able to finely deflate the inflatable product for reducing excessive internal pressure thereof.

A relief-valve device for an air pressure gauge in accordance with the present invention has a casing, a relief-valve assembly, a valve shaft, and a push button. The casing has a connecting member, a pressure detecting member and a discharging member. The relief-valve assembly is mounted in the discharging member and has a valve, a first seal ring, a second seal ring and a mounting cover. The valve shaft is mounted axially slidably in the relief-valve assembly and has a shaft member and a valve head. The shaft member has a discharging notch selectively aligning with the second seal ring to allow high pressure air in an inflatable product connecting to the air pressure gauge to be discharged slowly and finely out of the relied-valve device.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
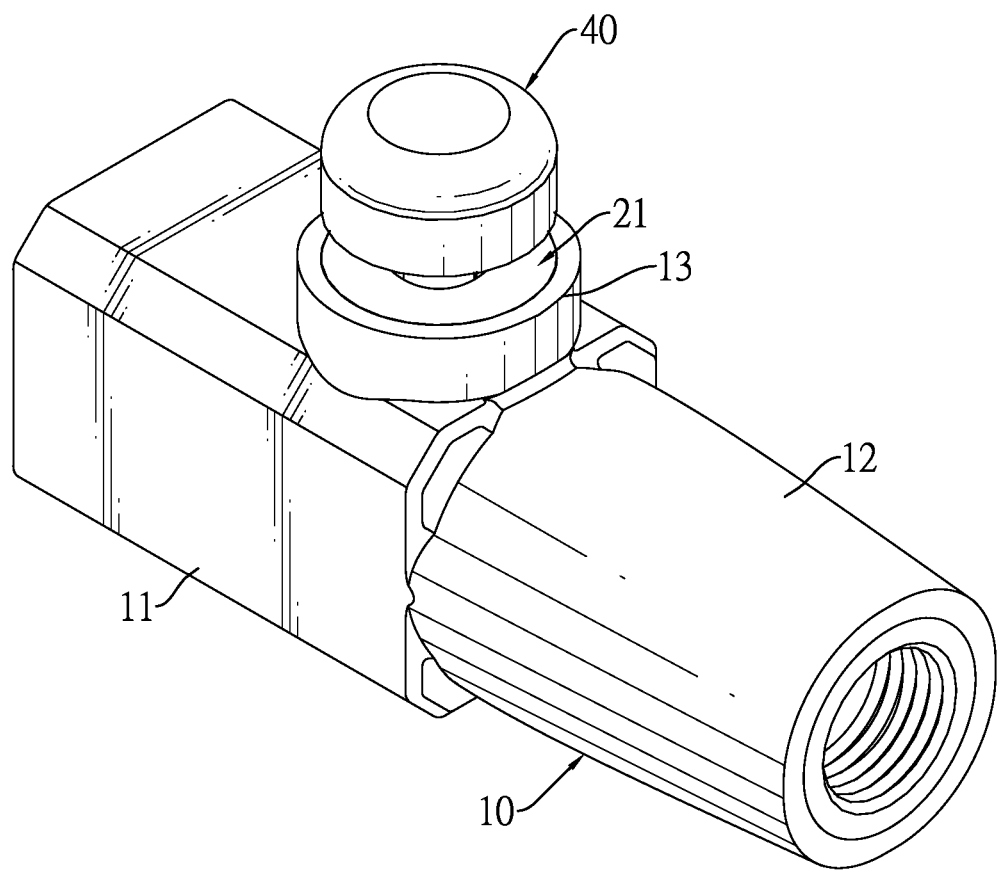
FIG. 1 is a perspective view of a relief-valve device for an air pressure gauge in accordance with the present invention.
Figure 2:
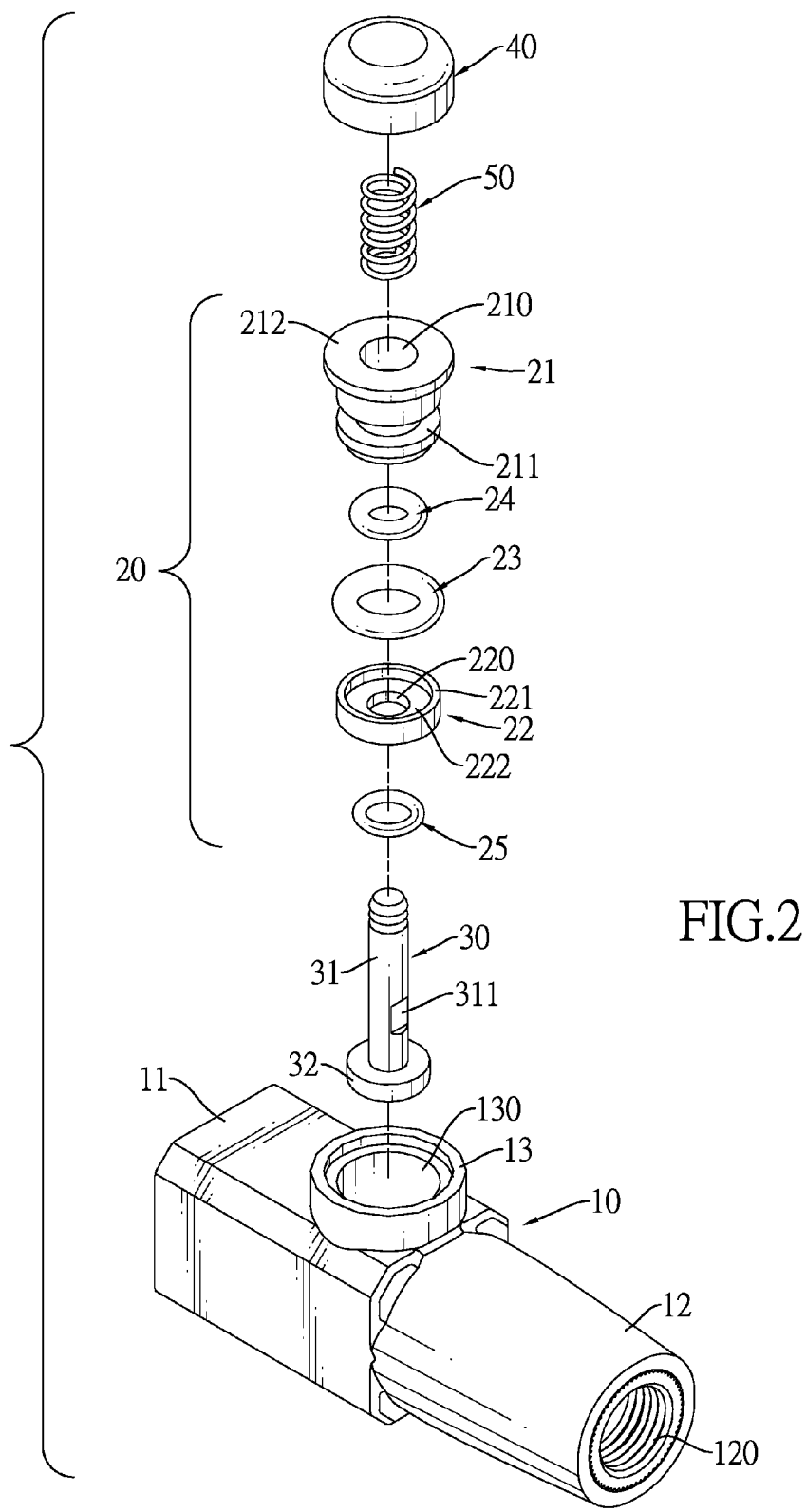
FIG. 2 is an exploded perspective view of the relief-valve device in FIG. 1.
Figure 5:
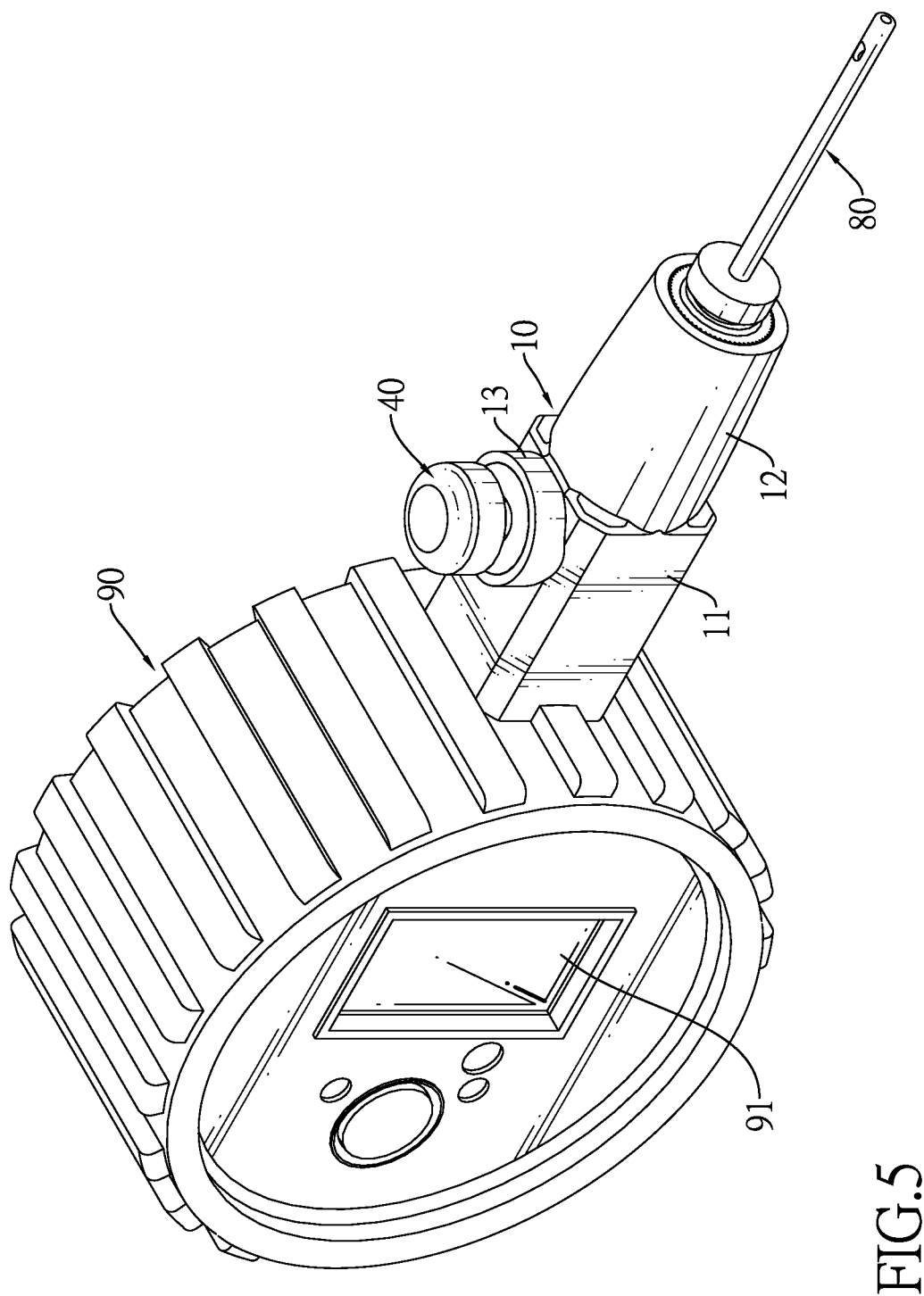
FIG. 5 is a perspective view of the relief-valve device assembled with a gauge body and a needle to form the air pressure gauge.

With reference to FIGS. 1, 2 and 5, a relief-valve device for an air pressure gauge in accordance with the present invention may be mounted on a gauge body 90 and a needle 80 to form an air pressure gauge. The gauge body 90 has a display 91 to indicate a pressure value measured from an inflatable product such as a basketball or a tire. The needle 80 may be inserted into a discharging hole of an inflatable product such as a basketball or a tire.

The relief-valve device comprises a casing 10, a relief-valve assembly 20, a valve shaft 30, a push button 40 and a spring 50.

The casing 10 has a connecting member 11, a pressure detecting member 12 and a discharging member 13.

The connecting member 11 has a connection hole 110 defined through the connecting member 11 for connecting the gauge body 90 to the casing 10.

The pressure detecting member 12 is formed on and protrudes axially from the connecting member 11 and has an air passageway 120 defined through the pressure detecting member 12, communicating with the connection hole 110 and receiving one end of the needle 80.

The discharging member 13 is formed on and protrudes substantially perpendicularly from the connecting member 11 and has an assembling hole 130 and an inner annular recess 1301. The assembling hole 130 is defined through the discharging member 13 and communicates with the connection hole 110 and the air passageway 120. The inner annular recess 1301 is defined radially in an inner surface of the assembling hole 130.

The relief-valve assembly 20 is mounted in the assembling hole 130 of the discharging member 13 of the casing 10 and has a valve seat 21, a first seal ring 23, a second seal ring 24 and a mounting cover 22.

The valve seat 21 is mounted in the assembling hole 130 of the discharging member 13 and has a valve hole 210, an outer annular groove 211, a mounting flange 212, an open annular slot 213 and an inner annular shoulder 2101. The valve hole 210 is defined through the valve seat 21. The outer annular groove 211 is defined radially in an outer surface of the valve seat 21. The mounting flange 212 is formed on and protrudes radially outward from the valve seat 21 and engages the inner annular recess 1301 of the casing 10. The open annular slot 213 is defined radially in an inner surface of the valve hole 210. The inner annular shoulder 2101 is formed on and protrudes radially inward from the inner surface of the valve hole 210.

The first seal ring 23 is mounted in the outer annular groove 211 of the valve seat 21 and airtightly contacts the inner surface of the assembling hole 130.

The second seal ring 24 is mounted in the open annular slot 213.

The mounting cover 22 is mounted in an inside end of the valve seat 21, axially closes the open annular slot 213 and has a through hole 220, a sleeve 221 and an inner annular flange 222. The through hole 220 is defined through the mounting cover 22. The sleeve 221 is mounted around the inside end of the valve seat 21. The inner annular flange 222 is formed on and protrudes radially inward from an inside end of the sleeve 221.

The valve shaft 30 is mounted axially slidably in the relief-valve assembly 20 and is selectively located at a shallower, released position or a deeper, pressed-down position relative to the discharging member 13 and the valve seat 21. The valve shaft 30 has a shaft member 31, a valve head 32 and a third seal ring 25.

The shaft member 31 is mounted axially slidably in the valve hole 210 of the valve seat 21 and the through hole 220 of the mounting cover 22 and has a discharging notch 311 defined radially in the shaft member 31.

The valve head 32 is formed on an inside end of the shaft member 31.

The third seal ring 25 is mounted around the shaft member 31 and located between the mounting cover 22 and the valve head 32.

The push button 40 is mounted on an outside end of the shaft member 31.

The spring 50 is mounted around the shaft member 31 of the valve shaft 30 and has two ends pressing respectively against the inner annular shoulder 2101 of the valve seat 21 and the push button 40.

Figure 3:
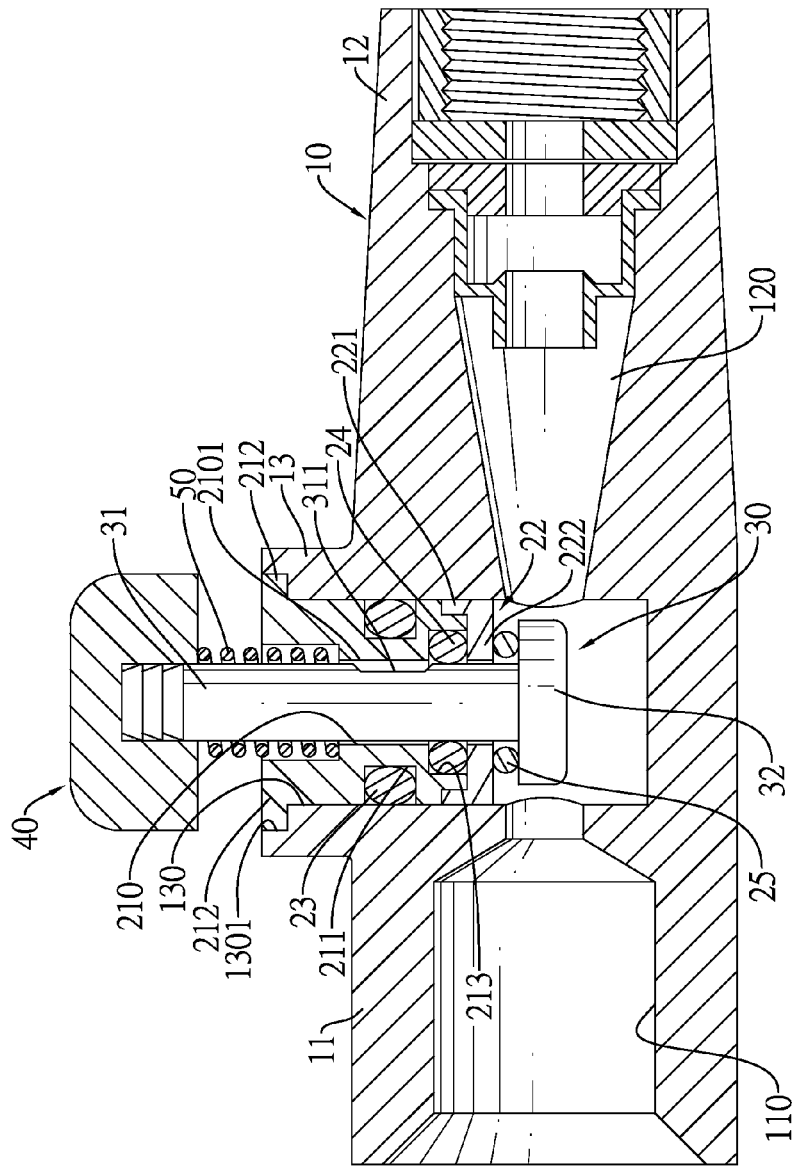
FIG. 3 is a cross sectional side view of the relief-valve device in FIG. 1.

With further reference to FIG. 3, when the valve shaft 30 is located at the shallower, released position relative to the discharging member 13 and the valve seat 21, the second seal ring 24 airtightly contacts a portion of the shaft member 31 other than the discharging notch 311, and the third seal ring 25 airtightly contacts the mounting cover 22 and the valve head 32 to close and prevent the valve hole 210 from communicating with an external atmosphere.

Figure 4:
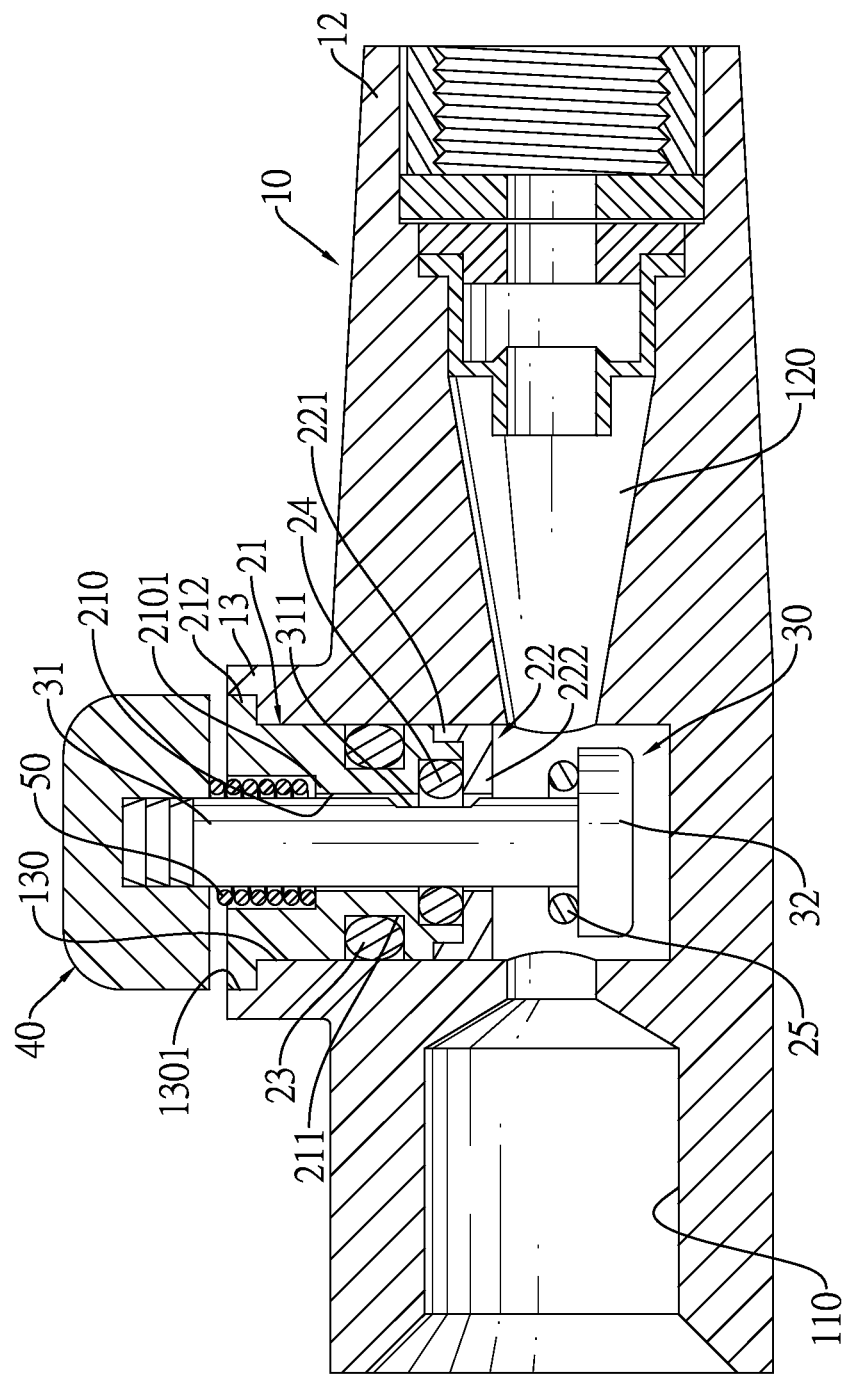
FIG. 4 is an operational cross sectional side view of the relief-valve device in FIG. 1.

With further reference to FIG. 4, when the valve shaft 30 is located at the deeper, pressed-down position relative to the discharging member 13 and the valve seat 21, the second seal ring 24 aligns contactlessly with the discharging notch 311 of the shaft member 31, and the third seal ring 25 separates from the mounting cover 22 such that the valve hole 210, the discharging notch 311, the air passageway 120 and the external atmosphere communicate with one another to allow the inflatable product to deflate slowly and finely.

The present invention has the following advantages.

1. When the valve shaft 30 is located in the released position, the second seal ring 24 airtightly contacts the valve shaft 30 and the third seal ring 25 airtightly contacts the mounting cover 22 and the valve head 32 to provide multi-sealing effect such that the inflatable product does not inadvertently deflate. The pressure value shown on the gauge body 90 is precisely the internal pressure of the inflatable product.

2. When the valve shaft 30 is located in the pressed-down position, the discharging notch 311 on the valve shaft 30 with comparatively small dimension relative to the valve hole 210 allows high pressure air in the inflatable product to discharge out of the relief-valve device. The small sized discharging notch 311 restricts the flow rate of the high pressure air so that a user may deflate the inflatable product finely to precisely achieve a predetermined pressure value by the relief-valve device without over deflation and re-inflation.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A relief-valve device for an air pressure gauge comprising:
    a casing having
        a connecting member having a connection hole defined through the connecting member;
        a pressure detecting member formed on and protruding axially from the connecting member and having an air passageway defined through the pressure detecting member and communicating with the connection hole; and
        a discharging member formed on and protruding substantially perpendicularly from the connecting member and having an assembling hole defined through the discharging member and communicating with the connection hole and the air passageway;
    a relief-valve assembly mounted in the assembling hole of the discharging member of the casing and having
        a valve seat mounted in the assembling hole of the discharging member and having
            a valve hole defined through the valve seat;
            an outer annular groove defined radially in an outer surface of the valve seat; and
            an open annular slot defined radially in an inner surface of the valve hole;
        a first seal ring mounted in the outer annular groove of the valve seat and airtightly contacting an inner surface of the assembling hole;
        a second seal ring mounted in the open annular slot; and
        a mounting cover mounted in an inside end of the valve seat, axially closing the open annular slot and having a through hole defined through the mounting cover;
    a valve shaft mounted axially slidably in the relief-valve assembly and selectively located at a released position or a pressed-down position relative to the discharging member and the valve seat, and having
        a shaft member mounted axially slidably in the valve hole of the valve seat and the through hole of the mounting cover and having a discharging notch defined radially in the shaft member;
        a valve head formed on an inside end of the shaft member; and
        a third seal ring mounted around the shaft member and located between the mounting cover and the valve head; and
    wherein when the valve shaft is located at the released position relative to the discharging member and the valve seat, the second seal ring airtightly contacts a portion of shaft member, and the third seal ring airtightly contacts the mounting cover and the valve head to close and prevent the valve hole from communicating with an external atmosphere; when the valve shaft is located at the pressed-down position relative to the discharging member and the valve seat, the second seal ring aligns contactlessly with the discharging notch of the shaft member, and the third seal ring separates from the mounting cover such that the valve hole, the discharging notch, the air passageway and the external atmosphere communicate with one another.

2. The relief-valve device as claimed in claim 1, wherein when the valve shaft is located at the released position, the second seal ring airtightly contacts the portion of shaft member other than the discharging notch.

3. The relief-valve device as claimed in claim 2 further comprising a push button mounted on an outside end of the shaft member.

4. The relief-valve device as claimed in claim 3, wherein the valve seat further has an inner annular shoulder formed on and protruding radially inward from the inner surface of the valve hole; and a spring is mounted around the shaft member of the valve shaft and has two ends pressing respectively against the inner annular shoulder of the valve seat and the push button.

5. The relief-valve device as claimed in claim 4, wherein the mounting cover further has a sleeve mounted around the inside end of the valve seat; and an inner annular flange formed on and protruding radially inward from an inside end of the sleeve.

6. The relief-valve device as claimed in claim 5, wherein the discharging member of the casing further has an inner annular recess defined radially in an inner surface of the assembling hole; and the valve seat further has mounting flange formed on and protruding radially outward from the valve seat and engaging the inner annular recess of the casing.

\* \* \* \* \*